April 10, 1951     L. G. ARPIN. JR     2,548,190

MOBILE FUEL CARRIER OR THE LIKE

Filed May 29, 1948     2 Sheets-Sheet 1

INVENTOR.
Leon G. Arpin, Jr.
BY S. Stephen Baker
ATTORNEY

Patented Apr. 10, 1951

2,548,190

UNITED STATES PATENT OFFICE 2,548,190

MOBILE FUEL CARRIER OR THE LIKE

Leon G. Arpin, Jr., Montclair, N. J.

Application May 29, 1948, Serial No. 30,031

8 Claims. (Cl. 280—5)

This invention relates to liquid carriers such as fuel tanks which are mobile and adapted to be towed by a moving vehicle.

It is an object of this invention to provide a fuel tank which may be towed with a minimum of driving power particularly in the presence of ground obstructions. Allied with this object is the provision of such a tank which can be caused to assume the shape of an obstruction which it encounters, as by being flexible or resilient, so that its propulsion may be simply and easily effected under a wide range of terrain conditions.

The tank has many other advantages such as will appear hereinafter. The above and other advantages are secured by forming the tank of flexible material and in cylindrical form so that the tank rolls bodily and wheels are unnecessary.

Referring to the drawing, wherein one form of the invention is disclosed:

Figure 1:
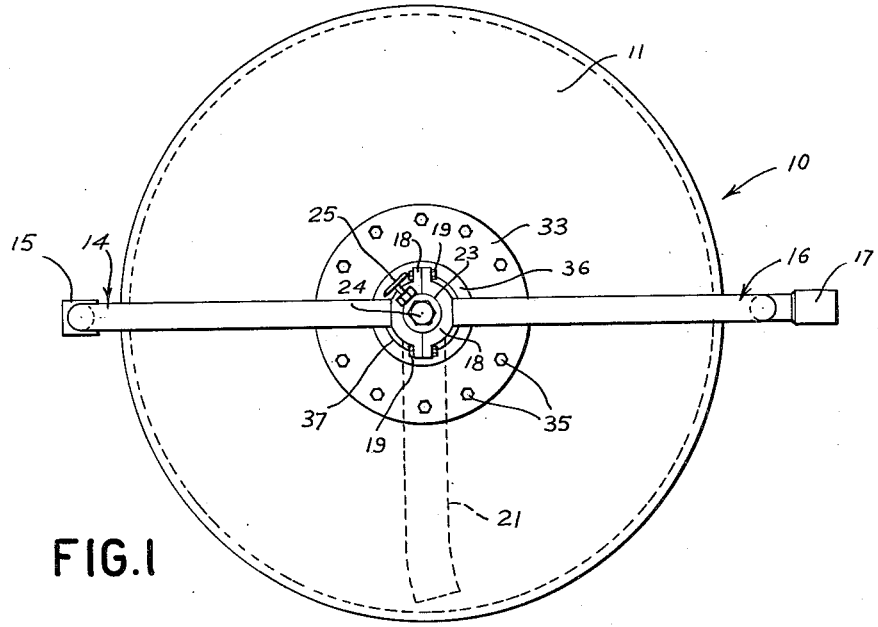
Fig. 1 is a side elevational view of a liquid carrier constructed according to the instant invention.
Figure 2:
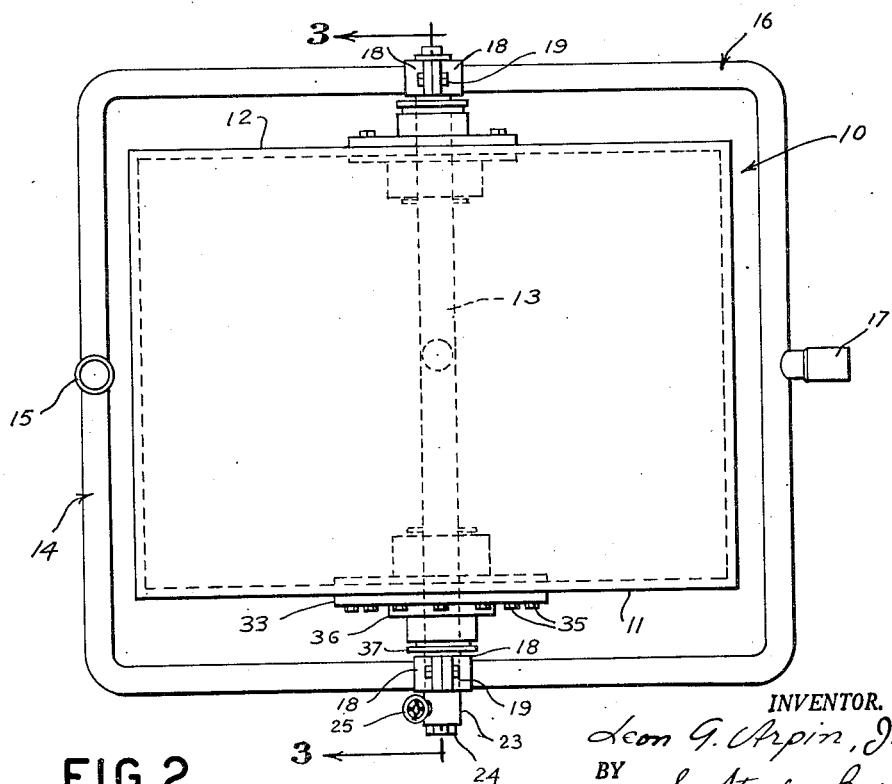
Fig. 2 is a top view thereof.

The tank comprises a body or reservoir 10 which is cylindrical in form so that the tank may roll along on its periphery. End walls 11 and 12 may be integral with such periphery so as to form an enclosed chamber or reservoir.

The tank is provided with a central axle 13 which does not rotate with the tank, the reservoir revolving thereabout pursuant to ground friction when the axle is pulled as during towing. In order to provide driving power, a U-shaped towing hitch 14 is secured to the respective ends of axle 13. Towing hitch 14 is formed with an opening 15 which is adapted to receive a hook or the like which is connected to a driving vehicle. When such hook is inserted in opening 15, towing hitch 14 propels the tank, the body 10 rolling along pursuant to such propelling forces.

Inasmuch as it may be desirable to provide means for propelling a series of tanks, a hauling hitch 16 is likewise secured at the ends of axle 13. Hauling hitch 16 is provided with a hook or the like at 17 so that it may be inserted into the opening 15 of a second, succeeding mobile tank. In this manner, any reasonable number of tanks may be intersecured and propelled. Each hitch is provided with a half collar 18 which embraces the axle ends which are mutually secured by bolts 19 so that the hitches are fixed to the axle, and form a frame for the body.

The tank body 10 is preferably, but not necessarily, formed of corded and rubberized material such as that employed for the casings of automobile tires. However, any sturdy flexible and preferably resilient material may be employed, as will be hereinafter made clear. It is also contemplated that an inner membrane of soft rubber will line the complete interior of body 10 so as to provide self-sealing functions such as are found in many aircraft fuel tanks.

Figure 3:
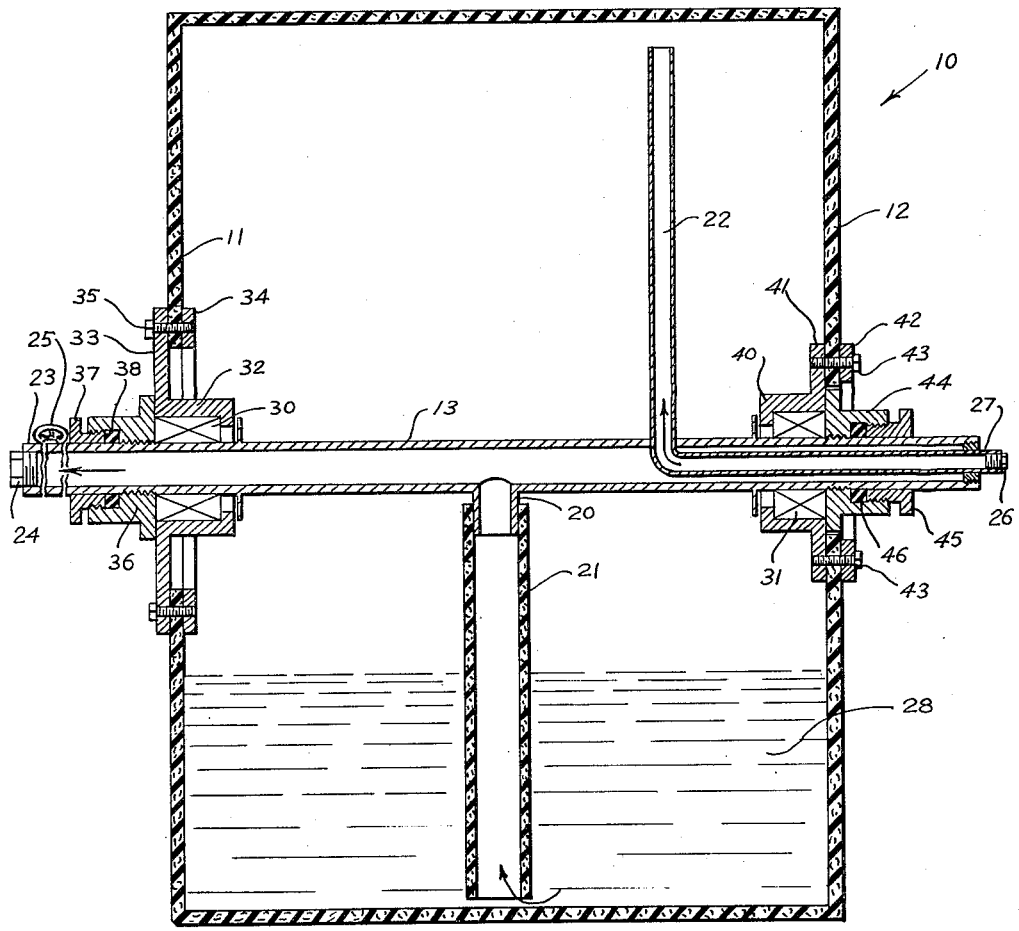
Fig. 3 is a section taken along the lines 3—3 of Fig. 2.

Referring to Fig. 3, it will be observed that the axle 13 is hollow and is provided with a short outlet pipe 20. Secured to outlet pipe 20 is a flexible tube 21 which may be of the same rubberized material as that described above. In order to evacuate air from the tank as it is being charged or filled with liquid, a vertical riser pipe 22 communicates with the hollow of axle 13 and is outwardly directed so that the exit or entrance of air may be externally controlled.

In order to fill the tank with fuel or other liquid, a source thereof may be introduced through the end 23 of axle 13. A threaded closure nut 24 is provided to seal off such end 23 when not in use and, as noted in Fig. 1, a hand-operated valve 25 may be provided so as to control the flow of liquid. When the tank is to be filled with liquid, nut 24 is removed and end 23 is connected to a source of fuel supply. Valve 25 is opened and threaded closure nut 26 of pipe 22 is likewise removed.

A contemplated method of filling the tank with liquid is to remove the nut 24 and apply the liquid under pressure to the hollow of axle 13. Simultaneously, nut 26 at the external end 27 of pipe 22 is removed so as to permit air to be vented from the tank. The liquid thereupon enters pipe 20 and flows through tube 21 into the bottom of the tank as at 28. The displaced air flows through riser pipe 22.

When the liquid is to be discharged as for the purpose of re-filling the fuel tank of a vehicle, air inlet nut 26 is opened as is valve 25. Air pressure is then applied through pipe 22 so as to cause the liquid 28 to rise in the tube 21 and be discharged through axle end 23, nut 24 having been removed. In actual practice, means for providing air under pressure may be derived from the conventional compressor as found on many vehicles so that operation of the compressor serves to discharge the fuel as required. As will be hereinafter set forth, it is desirable, even when liquid is not being discharged, to maintain the tank under low pressure so as to assist in maintaining its cylindrical shape even during towage.

The body 10 is caused to rotate about the axle 13 through the medium of anti-friction bearings 30 and 31 provided at the respective hub centers of the tank end walls. Bearing 30 is enclosed by annular housing 32 which is integral with annular end plate 33 which may be of steel or the like. Such end plate 33 is connected to end wall 11 and ring 34 as by bolts 35 radially arranged around plate 33. In order to maintain the apparatus well sealed, a packing gland comprising threaded collar 36 and a threaded nut 37 enclosing a fibrous or rubber gasket 38 is provided. Bearing 31 is enclosed by annular housing 40 which is integral with steel plate 41, such plate 41 being disposed inside of the tank rather than outside as is plate 33. A ring 42 is connected to end wall 12 and plate 41 by a series of radially arranged bolts 43. A packing gland is provided which substantially duplicates that of the end wall 11. Thus, collar 44 is threaded over axle 13 as disclosed and nut 45 and gasket 46 complete the packing gland.

It will be evident from the above that as the external ends of the axle are pulled through the action of towing hitch 14 while the tank is resting on the ground, the body 10 will revolve so as to move with the propelling vehicle. Inasmuch as the hitch 14 does not revolve during such propulsion, the axle 13 is similarly maintained against revolving and the tube 21 will remain in the lower position shown during all times when the tank is being propelled. As obstructions such as rocks are encountered, the periphery of the body 10 will give way so as to adapt the shape of the tank to the obstruction. In order to effect such action, the end walls 11 and 12 may buckle or become distorted pursuant to the inherent resiliency of the body material. Tube 21 being likewise of flexible and resilient material, will not punch holes or do any like damage to the interior of the tank when obstacles are encountered, since it will likewise buckle at this time.

It will be evident that when the tank is filled with liquid and propelled, it has a large bearing surface regardless of whether the ground is smooth or rocky or the like. Furthermore, such bearing surface is of particular advantage when the tank is pulled over soft or snowy terrain.

It will be observed that the diameter of the annular plate 41 is less than that of plate 33 and that the central opening of end wall 12 is likewise smaller than the central opening of end wall 11. The purpose thereof is to permit the axle, bearing and plates to be produced as a subassembly and introduced through the larger central opening of end wall 11 whereupon the plates may be made fast to the end walls as above described.

It is contemplated that when the tank is being propelled, an air pressure of approximately 2 pounds may be maintained within the body 10 so as to help preserve its cylindrical shape or form during such propulsion. As much of such air pressure as is warranted according to anticipated terrain conditions may be provided.

Whereas the method of discharging the fuel has been described as providing air pressure through air inlet end 27, it is feasible, particularly in emergencies, to open valve 25 so that the liquid will tend to run out while any balance may be syphoned off. It is also contemplated to provide intermediate annular walls extending parallel to walls 11 and 12 and fixed around axle 13 in spaced relationship. Such intermediate walls would not reach the periphery of body 10. Such intermediate walls would be fabricated of the rubberized material described above and would serve the purpose of further maintaining the cylindrical form of the tank even when it is towed at very high speeds.

Having described one form of the invention, what is claimed is:

1. A mobile reservoir tank for fluids comprising a hollow, flexible body of normally cylindrical form, said body being substantially fabricated from resilient material so as to resume said cylindrical form when distorted, and a hollow axle extending along the longitudinal axis of said cylinder, said hollow axle communicating with the interior of said body so as to provide fluid inlet and outlet means therefor.

2. A mobile reservoir tank for fluids comprising a hollow, flexible body of normally cylindrical form, said body being substantially fabricated from resilient material so as to resume said cylindrical form when distorted, and a hollow axle extending along the longitudinal axis of said cylinder, said hollow axle being formed with an outlet within said body and an elongated resilient tube extending from said outlet to a point adjacent the inner periphery of said body.

3. A mobile reservoir tank for fluids comprising a hollow, flexible body of normally cylindrical form, said body being substantially fabricated from resilient material so as to resume said cylindrical form when distorted, and a hollow axle extending along the longitudinal axis of said cylinder, said hollow axle being formed with an outlet within said body and an elongated resilient tube extending from said outlet to a point adjacent the inner periphery of said body, said hollow axle extending externally of said body so as to serve as trunnion means at each end thereof, said body being rotatable relative to said axle whereby a propelling force on said trunnion means while said body is resting on a support, causes said body to rotate pursuant to friction against said support.

4. A device according to claim 3 and including anti-friction bearings adjacent each end of said axle whereby said body may be rotated relative to said axle.

5. A mobile reservoir tank for fluids comprising a hollow, flexible body of normally cylindrical form, said body being substantially fabricated from resilient material so as to resume said cylindrical form when distorted, and a hollow axle extending along the longitudinal axis of said cylinder, said hollow axle being formed with an outlet within said body and an elongated resilient tube extending from said outlet to a point adjacent the inner periphery of said body, said hollow axle extending externally of said body so as to serve as trunnion means at each end thereof, said body being rotatable relative to said axle whereby a propelling force on said trunnion means while said body is resting on a support, causes said body to rotate pursuant to friction against said support, and a U-shaped towing hitch having the free ends thereof respectively connected to trunnion means at each axle end.

6. A device according to claim 5 and including a U-shaped hauling hitch having the free ends thereof respectively connected to the trunnion means at each axle end, said hitches being oppositely disposed so as to mutually form a frame around said body.

7. A mobile reservoir tank for fluids comprising a hollow, flexible body of normally cylindrical form, said body being substantially fabricated from resilient material so as to resume said cylindrical form when distorted, and a hollow axle extending along the longitudinal axis of said cylinder, said hollow axle being formed with an outlet within said body and an elongated resilient tube extending from said outlet to a point adjacent the inner periphery of said body, said hollow axle extending externally of said body so as to serve as trunnion means at each end thereof, said body being rotatable relative to said axle whereby a propelling force on said trunnion means while said body is resting on a support, causes said body to rotate pursuant to friction against said support, said body being fillable with fluid from one external extension of said hollow axle and an air pipe rising from said axle and operative to pass air as the body is being filled or emptied.

8. A mobile reservoir tank for fluids comprising a hollow, flexible body of normally cylindrical form, and including end walls so as to form an enclosed cylinder, said body being fabricated from resilient material and tending to resume its cylindrical form when distorted, a hollow axle extending transversely through said cylinder from one end wall to the other and further extending past both end walls, metal plates secured to the central area of each end wall, said axle traversing said metal plates, anti-friction bearings between each end of the axle and the respective metal plate, said plates cover openings being formed in the respective end walls, and one of said plates being larger than the other so that the smaller plate may be inserted through the opening of one end wall and secured to the other end wall.

LEON G. ARPIN, Jr.

REFERENCES CITED

The following references are of record in the file of this patent:

UNITED STATES PATENTS

| Number | Name | Date |
|---|---|---|
| 140,043 | Howard | June 17, 1873 |
| 801,276 | Spearman | Oct. 10, 1905 |
| 953,771 | Wilder | Apr. 5, 1910 |
| 1,436,594 | McClure | Nov. 21, 1922 |
| 2,222,047 | Snyder | Nov. 19, 1940 |
| 2,334,110 | McMahon | Nov. 9, 1943 |

FOREIGN PATENTS

| Number | Country | Date |
|---|---|---|
| 101,076 | Australia | May 27, 1937 |